United States Patent
Nixon

(10) Patent No.: US 8,954,643 B2
(45) Date of Patent: Feb. 10, 2015

(54) SCHEDULED PERIPHERAL COMPONENT INTERCONNECT ARBITER

(75) Inventor: Scott Alan Nixon, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 140 days.

(21) Appl. No.: 13/557,343

(22) Filed: Jul. 25, 2012

(65) Prior Publication Data
US 2014/0032804 A1 Jan. 30, 2014

(51) Int. Cl.
*G06F 13/00* (2006.01)
*G06F 13/372* (2006.01)

(52) U.S. Cl.
USPC ............. 710/124; 710/45; 710/111; 710/117

(58) Field of Classification Search
CPC ............... G06F 13/362; G06F 13/372; H04L 12/40013; H04L 12/40026; H04L 12/4035
USPC ................. 710/45, 117, 124, 111
See application file for complete search history.

(56) References Cited

U.S. PATENT DOCUMENTS

| | | | |
|---|---|---|---|
| 5,867,480 A | | 2/1999 | Thomas et al. |
| 5,907,689 A | | 5/1999 | Tavallaei et al. |
| 6,240,475 B1 | * | 5/2001 | Anubolu ..................... 710/107 |
| 6,385,657 B1 | * | 5/2002 | Parady ......................... 709/251 |
| 6,467,003 B1 | * | 10/2002 | Doerenberg et al. ......... 710/117 |
| 6,577,636 B1 | * | 6/2003 | Sang et al. ................. 370/395.7 |
| 6,940,816 B2 | | 9/2005 | McDonnell |
| 7,054,966 B2 | * | 5/2006 | Wells et al. .................. 710/100 |
| 7,433,984 B2 | * | 10/2008 | Das et al. ..................... 710/117 |
| 7,467,245 B2 | | 12/2008 | Metsker |
| 7,505,891 B2 | | 3/2009 | Lin |
| 7,594,057 B1 | | 9/2009 | Gandhi et al. |
| 7,739,436 B2 | * | 6/2010 | Meyer .......................... 710/111 |
| 7,912,068 B2 | | 3/2011 | Eberle et al. |
| 8,135,893 B2 | * | 3/2012 | Brindle ........................ 710/117 |
| 8,204,037 B2 | * | 6/2012 | Poledna et al. ............... 370/350 |
| 8,498,276 B2 | * | 7/2013 | Hall et al. ..................... 370/336 |
| 2009/0141744 A1 | * | 6/2009 | Poledna et al. ............... 370/503 |

OTHER PUBLICATIONS

Almeida, L. et al.; FTT-CAN: A Network-Centric Approach for CAN-Based Distributed Systems, DET-IEETA Universidade de Aveiro, P-3810-193 Aveiro, Portugal.

* cited by examiner

*Primary Examiner* — Brian Misiura
(74) *Attorney, Agent, or Firm* — Ingrassia Fisher & Lorenz, P.C.

(57) ABSTRACT

Systems and methods are described for arbitrating access of a communication bus. In one embodiment, a method includes performing steps on one or more processors. The steps include: receiving an access request from a device of the communication bus; evaluating a bus schedule to determine an importance of the device based on the access request; and selectively granting access of the communication bus to the device based on the importance of the device.

11 Claims, 4 Drawing Sheets

US 8,954,643 B2

SCHEDULED PERIPHERAL COMPONENT INTERCONNECT ARBITER

STATEMENT REGARDING FEDERALLY SPONSORED RESEARCH OR DEVELOPMENT

This invention was made with U.S. Government support under Contract No NNJT06TA25C awarded by NASA Johnson Space Center The government has certain rights in this invention.

TECHNICAL FIELD

The present disclosure generally relates to data transmission, and more particularly relates to methods and systems for managing the transmission of data over a communications network based on data importance.

BACKGROUND

When used in a real-time system that requires a high level of determinism, the variability of traffic timing on a peripheral component interconnect (PCI) bus can cause transmission issues. For example, data from devices that have high importance may not be able to make it on the bus if data from lower importance devices have been granted access. This is a result of using the standard PCI arbiter which relies on a simple fairness algorithm that has no knowledge of data or device importance or higher level system timing issues.

As a result, it is desirable to provide methods and systems for monitoring and transmitting data according scheduling methods and systems that take into account importance of data or devices. Other desirable features and characteristics will become apparent from the subsequent detailed description and the appended claims, taken in conjunction with the accompanying drawings and this background of the invention.

BRIEF SUMMARY

According to various exemplary embodiments, systems and methods are described for arbitrating access of a communication bus. In one embodiment, a method includes performing steps on one or more processors. The steps include: receiving an access request from a device of the communication bus; evaluating a bus schedule to determine an importance of the device based on the access request; and selectively granting access of the communication bus to the device based on the importance of the device.

In another exemplary embodiment, a system includes a first module that receives an access request from a device of the communication bus and that evaluates a bus schedule to determine an importance of the device based on the access request. A second module selectively grants access of the communication bus to the device based on the importance of the device.

In still another exemplary embodiment, a computer program product is provided for arbitrating access of a communication bus. The computer program product includes a tangible storage medium readable by a processing circuit and storing instructions for execution by the processing circuit for performing a method. The method includes performing steps on one or more processors. The steps include: receiving an access request from a device of the communication bus; evaluating a bus schedule to determine an importance of the device based on the access request; and selectively granting access of the communication bus to the device based on the importance of the device.

Other embodiments, features and details are set forth in additional detail below.

BRIEF DESCRIPTION OF THE DRAWINGS

The present invention will hereinafter be described in conjunction with the following figures, wherein like numerals denote like elements.

DETAILED DESCRIPTION

The following detailed description of the invention is merely example in nature and is not intended to limit the invention or the application and uses of the invention. Furthermore, there is no intention to be bound by any theory presented in the preceding background or the following detailed description. As used herein, the term "module" refers to any hardware, software, firmware, electronic control component, processing logic, and/or processor device, individually or in any combination, including, without limitation: an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
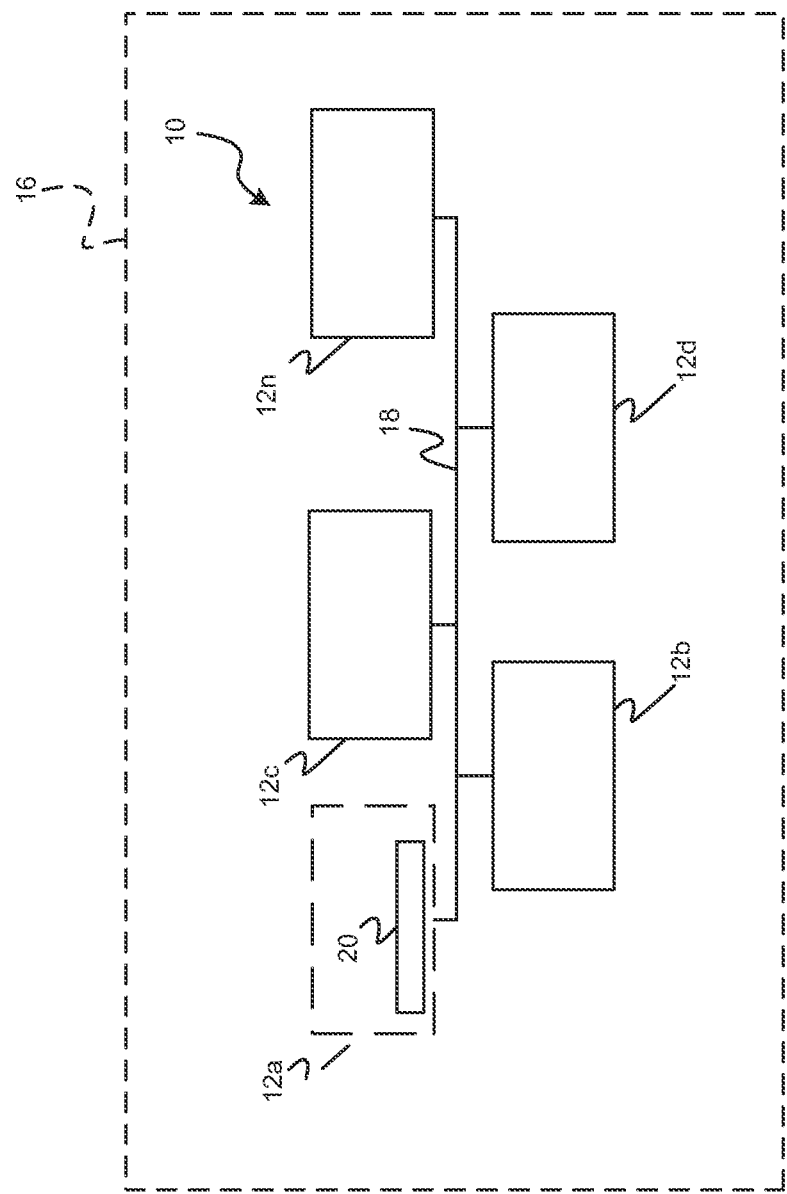
FIG. 1 is a functional block diagram illustrating a network that includes scheduling methods and systems in accordance with exemplary embodiments.

Turning now to the figures and with initial reference to FIG. 1, an exemplary network 10 for providing communications between one or more devices 12a-12n is shown to include a scheduling system in accordance with various embodiments. Although the figures shown herein depict an example with certain arrangements of elements, additional intervening elements, devices, features, or components may be present in actual embodiments. It should also be understood that FIG. 1 is merely illustrative and may not be drawn to scale.

Each device 12a-12n of the exemplary network 10 may be a fixed device or a mobile device that communicates data according to one or more networking protocols. In various embodiments, the devices 12a-12n of the network include navigation devices, aircraft component control devices, and/or any other devices of an aircraft 16. As can be appreciated, the scheduling methods and systems of the present disclosure may be applicable to various devices of various systems and is not limited to the present example. The data is communicated from one device 12a-12n to another device 12a-12n through a communication bus 18. The communication bus 18 can be a parallel or a serial communication bus that is wired, wireless, or a combination thereof.

Figure 2:
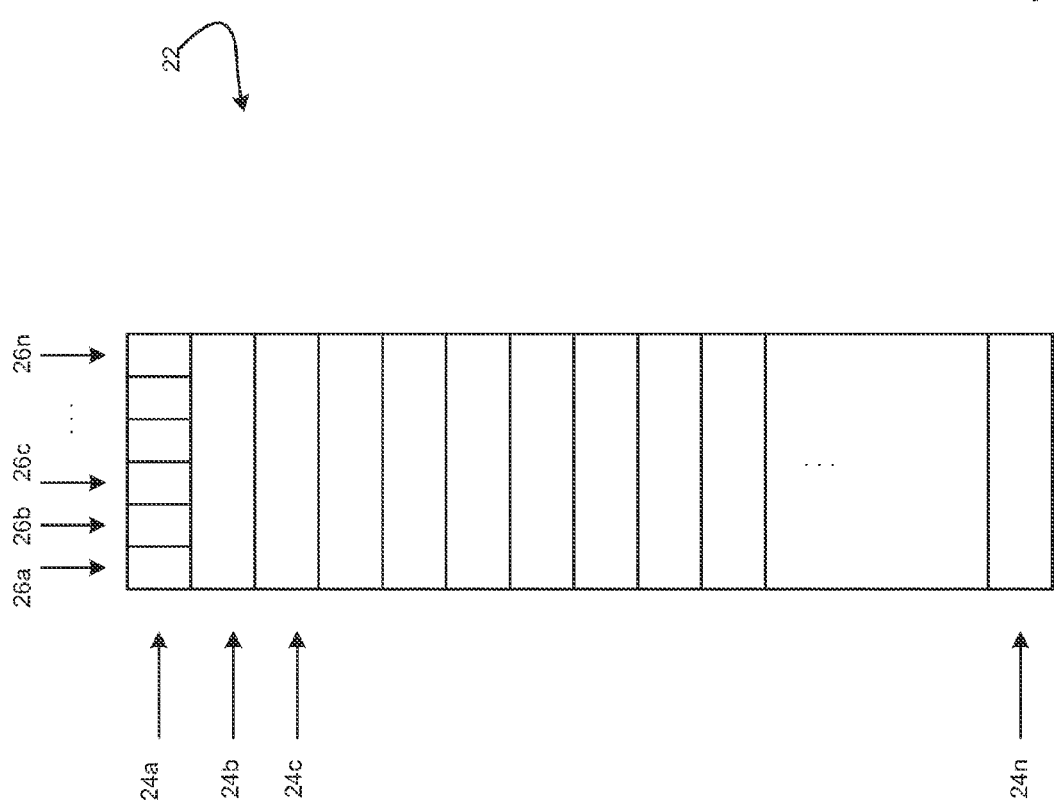
FIG. 2 is an illustration of a bus schedule of the scheduling methods and systems in accordance with exemplary embodiments.

At least one of the devices 12a-12n, for example device 12a, includes a scheduling module 20 in accordance with exemplary embodiments. As can be appreciated, the scheduling module 20 may also be implemented on all of the devices 12a-12n or a group of the devices 12a-12n and is not limited to the present example. The scheduling module 20 includes a bus schedule 22 (FIG. 2). The scheduling module 20 grants access to the communication bus 18 for the various devices 12a-12n based on the bus schedule 22 (FIG. 2). The bus schedule 22 stores data indicating an importance of the devices 12a-12n and/or the data from the devices 12a-12n.

In various embodiments, as shown in FIG. 2, the bus schedule 22 includes one or more data elements 24a-24n associated with one or more time slots of the communication bus 18. Each data element 24a-24n stores status indicators (e.g., one bit, or other number of bits/bytes) 26a-26n. The status indicators 26a-26n are associated with a device 12a-12n on the communication bus 18 and are set to indicate whether the device 12-12n may have access to the communication bus at that time slot. Thus, devices 12a-12n with higher importance may have access to the communication bus 18 for all of the time slots while devices with lower importance may only have access to the communication bus 18 for a subset of time slots.

Before granting access to the communication bus 18, the scheduling module 20 checks the status indicator 26a-26n of the data element 24a-24n for the particular time slot to see if the device 12a-12n is permitted to use the communication bus 18 for transmission. If the status indicator 26a-26n indicates that the device 12a-12n may have access to the communication bus 18 at the particular time slot, the scheduling module 20 grants the device 12a-12n access to the communication bus 18.

Figure 3:
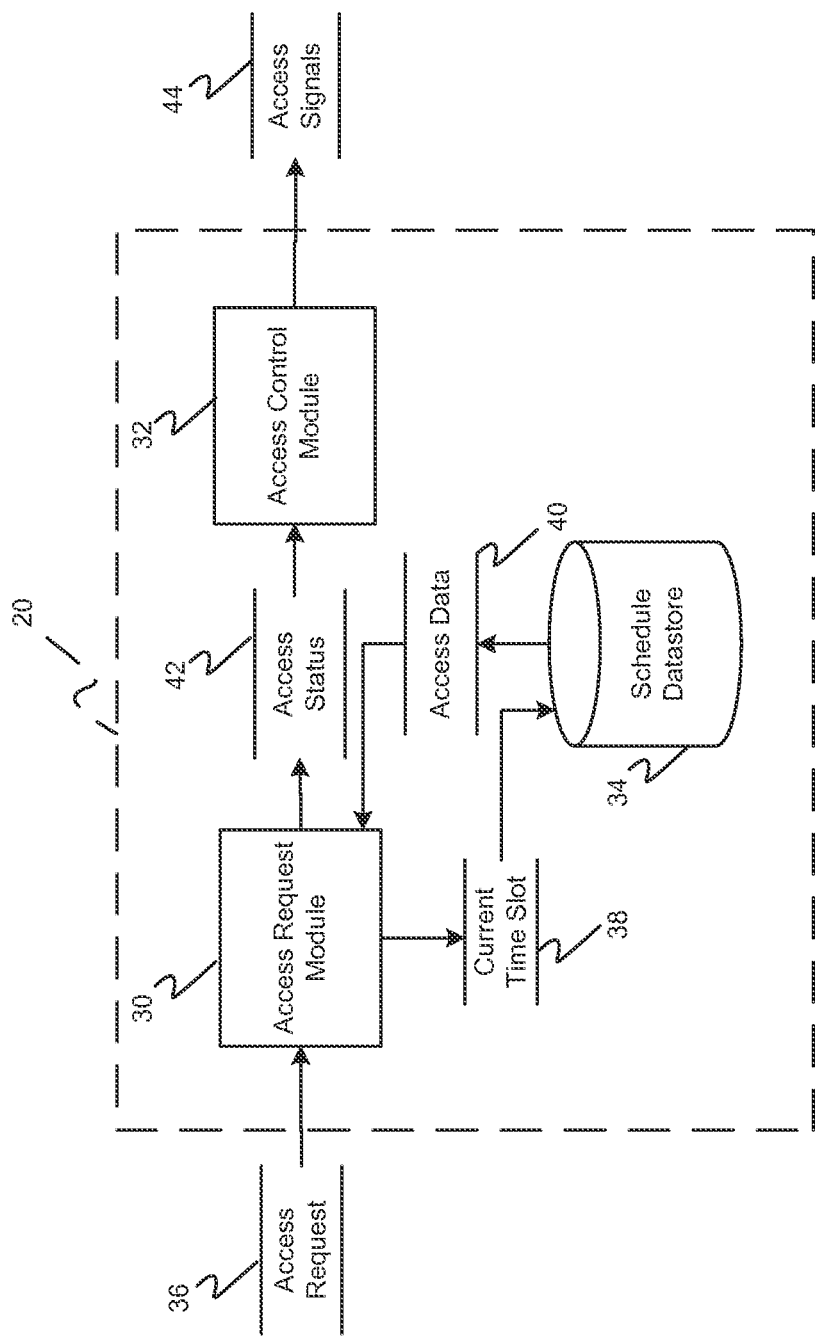
FIG. 3 is a dataflow diagram illustrating a scheduling module in accordance with exemplary embodiments.

Referring now to FIG. 3, a dataflow diagram illustrates various embodiments of the scheduling module 20. Various embodiments of scheduling modules 20 according to the present disclosure may include any number of sub-modules embedded within the scheduling module 20. As can be appreciated, the sub-modules shown in FIG. 3 may be combined and/or further partitioned to similarly arbitrate access to the communication bus. Inputs to the scheduling module 20 may be received from other modules (not shown) of other devices 12a-12n (FIG. 1), and/or determined/modeled by other sub-modules (not shown) within the scheduling module 20. In various embodiments, the scheduling module 20 includes an access request module 30, an access control module 32, and a schedule datastore 34.

The schedule datastore 34 stores the bus schedule 22 (FIG. 2). As can be appreciated, the bus schedule 22 (FIG. 2) can be preconfigured and stored in the schedule datastore 34, and/or can be configurable based on devices 12a-12n (FIG. 1) that may be added to or removed from the communication bus 18 (FIG. 1).

The access request module 30 receives as input access requests 36. The access requests 36 indicate a device's intent to utilize the communication bus 18 (FIG. 1) for transmission of data. When an access request 36 is received, the access request module 30 retrieves access data 40 that includes the status indicators 26a-26n (FIG. 2) from the bus schedule 22 (FIG. 1) that is stored in the schedule datastore 34. The access request module 30 retrieves the access data 40 based on a current time slot 38 of the communication bus 18 (FIG. 1).

In various embodiments, the access request module 30 manages the current time slot 38 of the communication bus 18 (FIG. 1). For example, the access request module 30 initializes the current time slot 38 to a predetermined number (e.g., zero). Thereafter, the access request module 30 increments the current time slot 38 after predetermined intervals of time pass (e.g., every x milliseconds). Once the current time slot 38 reaches a predetermined maximum (e.g., equal to one minus the number of time slots in the schedule), the access request module 30 resets the current time slot 38 to zero. As can be appreciated, the access request module 30 may manage the current time slot 38 according to other methods and is not limited to the present example.

Once the access request module 30 retrieves the access data 40, the access request module 30 evaluates the status indicators 26a-26n to determine if the particular device has access to that time slot of the communication bus 18. For example, the access request module 30 evaluates the status indicator 26a-26n (e.g., the bit or other number of bits/bytes) associated with the device 12a-12n to see if it is set to one (or other value indicating TRUE). If the status indicator 26a-26n is set to one, then an access status 42 is set to indicate that access is granted for the particular device 12a-12n. If, however, the status indicator 26a-26n is set to zero, then the access status 42 is set to indicate that access is not granted for the particular device 12a-12n.

The access control module 32 receives as input the access status 42. Based on the access status 42, the access control module 32 generates access signals 44 to permit or deny the device 12a-12n access to the communication bus 18 (FIG. 1). For example, if the access status 42 indicates that the device 12a-12n does not have access to the time slot, no access signals 44 are generated. If, however, the access status 42 indicates that the device 12a-12n does have access to the time slot, the access signals 44 are generated to permit the transmission of data in the current time slot on the communication bus 18 (FIG. 1).

Figure 4:
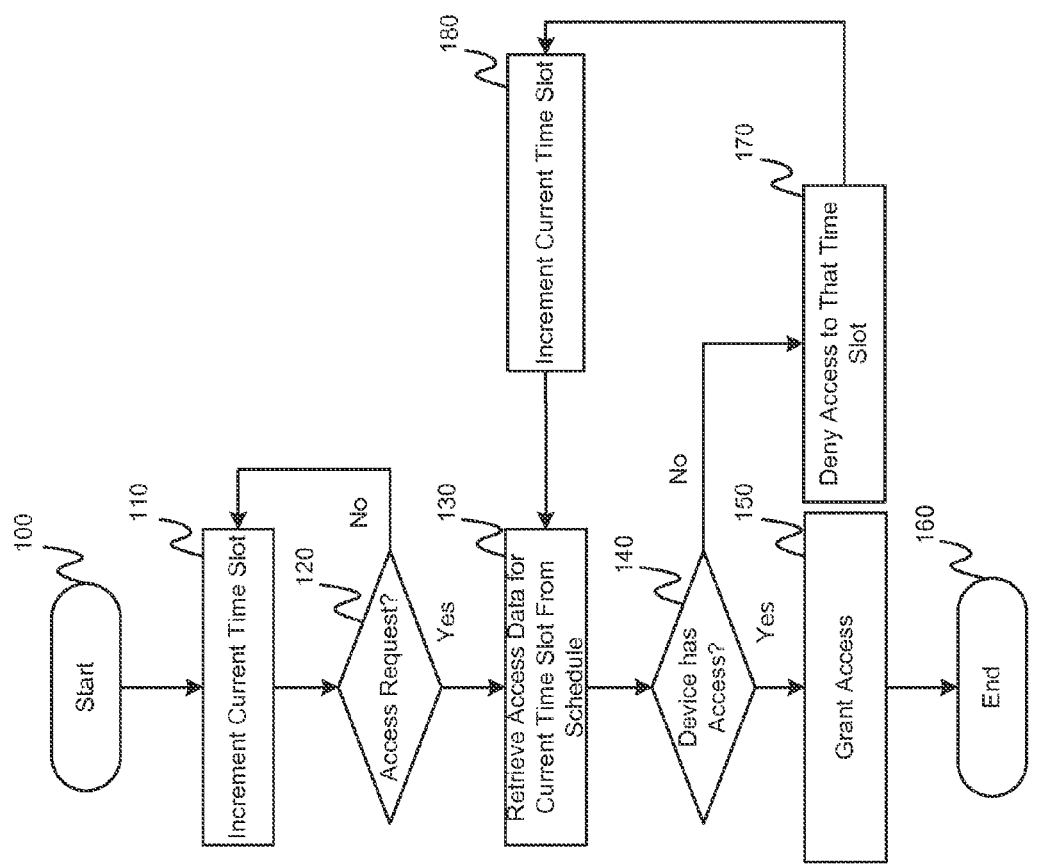
FIG. 4 is a flowchart illustrating a scheduling method in accordance with exemplary embodiments.

Referring now to FIG. 4, and with continued reference to FIGS. 1-3, a flowchart illustrates a scheduling method that can be performed by the scheduling module of FIG. 1 in accordance with the present disclosure. As can be appreciated in light of the disclosure, the order of operation within the methods is not limited to the sequential execution as illustrated in FIG. 4, but may be performed in one or more varying orders as applicable and in accordance with the present disclosure.

As can be appreciated, the scheduling method may be scheduled to run based on predetermined events, and/or can run continually at predetermined intervals during operation of the device 12a or the communication bus 18.

The method may begin at 100. The current time slot 38 is incremented (e.g., as discussed above) at 110. It is determined whether an access request 36 is received at 120. If an access request 36 is received at 120, the access data 40 for the current time slot 38 is retrieved from the bus schedule 22 stored in the schedule datastore 34 at 130 and is evaluated at 140. If the access data 40 indicates that the device 12a-12n has access to that time slot (e.g., the bit associated with that device is one or TRUE) at 140, then access is granted to the device and access signals 44 are generated at 150. Thereafter, the method may end at 160.

If, however, the access data 40 indicates that the device 12a-12n does not have access to that time slot at 140, access is denied at 170 and the current time slot 38 is incremented (e.g., as discussed above) at 180. Thereafter, the access data 40 for the next time slot is retrieved from the bus schedule 22 stored in the schedule datastore 34 at 130 and is evaluated at 140. This loop continues until the access data 40 indicates that the device 12a-12n has access to the time slot at 140. Thereafter, the method may end at 160.

Although the exemplary method is discussed with regard to a single access request being received and evaluated, it is appreciated that in various embodiments, multiple access requests may be received and processed substantially simultaneously for each time slot. In various embodiments, if more than one request is received and each of the requests is enabled for the current time slot, various methods may be performed to determine which request is granted access. The methods may include, but are not limited to, priority based on FIG. 2 (e.g., left to right or right to left), traditional fairness methods, methods evaluating the amount of data to transfer, etc.

As can be appreciated, one or more aspects of the present disclosure can be included in an article of manufacture (e.g., one or more computer program products) having, for instance, computer usable media. The media has embodied therein, for instance, computer readable program code means for providing and facilitating the capabilities of the present disclosure. The article of manufacture can be included as a part of a computer system or provided separately.

Additionally, at least one program storage device readable by a machine, tangibly embodying at least one program of instructions executable by the machine to perform the capabilities of the present disclosure can be provided.

While at least one example embodiment has been presented in the foregoing detailed description of the invention, it should be appreciated that a vast number of equivalent variations exist. It should also be appreciated that the embodiments described above are only examples, and are not intended to limit the scope, applicability, or configuration of the invention in any way. Rather, the foregoing detailed description will provide those skilled in the art with a convenient road map for implementing various examples of the invention. It should be understood that various changes may be made in the function and arrangement of elements described in an example embodiment without departing from the scope of the invention as set forth in the appended claims and their legal equivalents.

What is claimed is:

1. A method of arbitrating access of peripheral devices on a peripheral component interconnect (PCI) bus, comprising:
performing on one or more processors,
storing a plurality of time slots for each peripheral device of the peripheral devices on the PCI bus in a bus schedule;
setting a status indicator for each time slot of each peripheral device of the peripheral devices on the PCI bus in the bus schedule;
receiving an access request from a peripheral device of the PCI bus;
determining a current time slot;
evaluating the status indicator stored in the time slot associated with the current time slot of the bus schedule to determine an importance of the peripheral device; and
selectively granting access of the PCI bus to the peripheral device based on the importance of the peripheral device, wherein the status indicators are single bit status indicators and are associated with peripheral devices on the PCI bus.

2. The method of claim 1 wherein the determining the current time slot is based on a predetermined time interval.

3. The method of claim 1 wherein the importance of the peripheral device is based on whether the peripheral device is permitted to transmit data during a time slot of the PCI bus.

4. The method of claim 1 wherein the granting access to the PCI bus comprises generating access signals to permit transmission of data by the peripheral device on the PCI bus.

5. A system for arbitrating access of peripheral devices on a peripheral component interconnect (PCI) bus, comprising:

a datastore that stores a plurality of time slots for each peripheral device of the peripheral devices on the PCI bus in a bus schedule, and that stores a status indicator for each time slot of each peripheral device of the peripheral devices on the PCI bus in the bus schedule;

a first module that receives an access request from a peripheral device of the communication bus, that determines a current time slot, and that evaluates the status indicator stored in the time slot associated with the current time slot of the bus schedule to determine an importance of the peripheral device based on the access request; and a second module that selectively grants access of the PCI bus to the peripheral device based on the importance of the peripheral device, wherein the status indicators are single bit status indicators and are associated with peripheral devices on the PCI bus.

6. The system of claim 5 wherein the first module determines the current time slot based on a predetermined time interval.

7. The system of claim 5 wherein the importance of the peripheral device is based on whether the device is permitted to transmit data during a time slot of the PCI bus.

8. The system of claim 5 wherein the second module grants access to the PCI bus by generating access signals to permit transmission of data by the peripheral device on the PCI bus.

9. A computer program product for arbitrating access of peripheral devices on a peripheral component interconnect (PCI) bus, comprising:

a tangible storage medium readable by a processing circuit and storing instructions for execution by the processing circuit for performing a method comprising:

storing a plurality of time slots for each peripheral device of the peripheral devices on the PCI bus in a bus schedule;

setting a status indicator for each time slot of each peripheral device of the peripheral devices on the PCI bus in the bus schedule;

receiving an access request from a peripheral device of the PCI bus;

determining a current time slot;

evaluating the status indicator stored in the time slot associated with the current time slot of the bus schedule to determine an importance of the peripheral device; and selectively granting access of the PCI bus to the peripheral device based on the importance of the peripheral device, wherein the-status indicators are single bit status indicators that are associated with peripheral devices on the PCI bus.

10. The computer program product of claim 9 wherein the importance of the peripheral device is based on whether the device is permitted to transmit data during a time slot of the PCI bus.

11. The computer program product of claim 9 wherein the granting access to the PCI bus comprises generating access signals to permit transmission of data by the peripheral device on the PCI bus.

* * * * *